United States Patent
Liebman et al.

(10) Patent No.: US 7,926,167 B1
(45) Date of Patent: Apr. 19, 2011

(54) METHOD TO ASSEMBLE A DISK DRIVE

(75) Inventors: Michael K. Liebman, Sunnyvale, CA (US); Antony Tuyen Nguyen, San Jose, CA (US); Thomas Anthony Tacklind, San Martin, CA (US); August L. Klerks, Fremont, CA (US); Amir Norton, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 335 days.

(21) Appl. No.: 12/188,886

(22) Filed: Aug. 8, 2008

(51) Int. Cl.
*G11B 5/127* (2006.01)
*H04R 31/00* (2006.01)

(52) U.S. Cl. ............... 29/603.03; 29/603.04; 29/603.06; 29/603.07; 29/712; 29/737; 294/2; 294/64.1; 360/294.4; 360/294.5; 360/294.6; 360/294.7

(58) Field of Classification Search ............... 29/603.03, 29/603.04, 603.06, 603.07, 712, 729, 737; 26/606, 760; 360/394.4–294.7; 294/2, 64.1
See application file for complete search history.

(56) References Cited

U.S. PATENT DOCUMENTS

| | | |
|---|---|---|
| 6,094,047 A | 7/2000 | Guzik et al. |
| 6,608,733 B2 | 8/2003 | Elsing |
| 6,937,432 B2 | 8/2005 | Sri-Jayantha et al. |
| 6,950,727 B2 | 9/2005 | Ichikawa |
| 7,064,923 B2 | 6/2006 | Tran et al. |
| 7,099,112 B1 | 8/2006 | Harper |
| 7,102,850 B1 | 9/2006 | Buzek et al. |
| 7,199,971 B1 | 4/2007 | Buzek et al. |
| 7,295,400 B2 | 11/2007 | Tran et al. |
| 7,327,531 B2 | 2/2008 | Elsing |
| 2003/0192166 A1 | 10/2003 | Kelemen |
| 2004/0111872 A1* | 6/2004 | Pfeiffer et al. ............. 29/603.01 |
| 2006/0087764 A1 | 4/2006 | Fu et al. |
| 2007/0121242 A1 | 5/2007 | Lee et al. |
| 2007/0146927 A1 | 6/2007 | Makita |
| 2008/0037163 A1* | 2/2008 | Kohei et al. ................ 360/98.08 |

* cited by examiner

*Primary Examiner* — Paul D Kim

(57) ABSTRACT

A method to assemble a disk drive having a spindle that includes a hub. At least one disk is placed on the hub. A clamp is fastened to the hub by a plurality of threaded fasteners. Each of the plurality of threaded fasteners is initially tightened. After initial tightening, an initial couple imbalance of the spindle is determined. After the initial couple imbalance is determined, a first selected threaded fastener of the plurality of threaded fasteners is selected and rotated by a first amount of rotation that is significantly different from a second amount of rotation of a second selected threaded fastener of the plurality of threaded fasteners. The selection and rotation of the first selected threaded fastener of the plurality of fasteners is determined based on the initial couple imbalance of the spindle.

19 Claims, 6 Drawing Sheets

METHOD TO ASSEMBLE A DISK DRIVE

FIELD OF THE INVENTION

The present invention relates generally to information storage devices, and in particular to methods for reducing vibration emitted by a disk drive.

BACKGROUND

The typical hard disk drive includes a head disk assembly (HDA) and a printed circuit board assembly (PCBA) attached to a disk drive base of the HDA. The HDA includes at least one disk (such as a magnetic disk, magneto-optical disk, or optical disk), a spindle for rotating the disk, and a head stack assembly (HSA). The PCBA includes electronics and firmware for controlling the rotation of the spindle and for controlling the position of the HSA, and for providing a data transfer channel between the disk drive and its host.

The HSA typically includes an actuator, at least one head gimbal assembly (HGA), and a flex cable assembly. During operation of the disk drive, the actuator must rotate to position the HGAs adjacent desired information tracks on the disk. The actuator includes a pivot-bearing cartridge to facilitate such rotational positioning. The pivot-bearing cartridge fits into a bore in the body of the actuator. One or more actuator arms extend from the actuator body. An actuator coil is supported by the actuator body, and is disposed opposite the actuator arms. The actuator coil is configured to interact with one or more fixed magnets in the HDA, to form a voice coil motor. The PCBA provides and controls an electrical current that passes through the actuator coil and results in a torque being applied to the actuator.

Each HGA includes a head for reading and writing data from and to the disk. In magnetic recording applications, the head typically includes a slider and a magnetic transducer that comprises a writer and a read element. In optical recording applications, the head may include a mirror and an objective lens for focusing laser light on to an adjacent disk surface. The slider is separated from the disk by a gas lubrication film that is typically referred to as an "air bearing."

The spindle typically includes a rotor including one or more rotor magnets and a rotating hub on which disks are mounted and clamped, a clamp attached to the rotating hub, and a stator. If more than one disk is mounted on the hub, the disks are typically separated by spacer rings that are mounted on the hub between the disks. Various coils of the stator are selectively energized to form an electromagnetic field that pulls/pushes on the rotor magnet(s), thereby rotating the hub. Rotation of the spindle hub results in rotation of the clamp, spacer rings, and mounted disks.

Excessive imbalance of the disk mounting hub, disk clamp, disks, and spacer rings (if any) of the spindle can cause undesirable disk drive vibrations and associated customer complaints. In extreme cases, such vibrations might even degrade the ability of the actuator to position the heads adjacent desired information tracks on the disk for reading and writing data. Therefore, it is advantageous to balance the hub, clamp, disk(s), and spacer rings (if any) of the spindle while or after they are assembled together.

In the environment of modern disk drive manufacturing, thousands of disk drive spindles need to be balanced each day, and so tools (typically automated to some degree) have been developed to facilitate this. Such tools may be capable of adding, removing, or moving one or more masses on the hub to counteract a net radial imbalance of the rotor (i.e. a net imbalance that would tend to dynamically translate the axis of rotation).

For example, such a balancing tool may measure an initial imbalance, and then select and affix a balancing ring of appropriate size and mass to the top of the disk clamp. Such balancing would counteract only a net radial imbalance. However, correction of net radial imbalance does not correct so-called "couple imbalance" where the imbalance causes a rotating moment to be applied to the spindle out of the plane of the disk. For example, such couple imbalance may be represented by equal and opposite radial imbalances at different heights along the spindle axis of rotation, so that the net radial imbalance is zero but nevertheless vibration is caused and emitted by the spindle and disk drive. Couple imbalance can cause Z-direction vibration to be emitted by the disk drive, where the Z-direction is a direction parallel to the spindle axis of rotation. Limiting Z-direction emitted vibration can be an important disk drive customer requirement.

A more complex balancing tool may correct couple imbalance by measuring an initial couple imbalance, and then selecting and affixing discrete balancing masses (e.g. plugs) at different heights through openings in the disk clamp and into selected holes in a pattern of holes in the spindle hub, the holes being at different angular positions relative to the spindle hub.

However, more complex balancing tools and methods tend to complicate both the manufacturing process and the disk drive design, and can represent substantial cost in a high-volume manufacturing environment. Moreover, the installation of balancing plugs to correct couple imbalance (a.k.a. multi-plane imbalance) may not be practical in smaller form factor disk drives, such as 2.5 inch form factor disk drives and smaller, because in such disk drives the walls of the spindle hub may be too thin. Thus, there is a need in the art for simpler and less expensive methods for reducing couple imbalance in a disk drive, and/or reducing vibration emitted by a disk drive.

SUMMARY

A method to assemble a disk drive is disclosed and claimed. The disk drive has a spindle that includes a hub. At least one disk is placed on the hub. A clamp is fastened to the hub by a plurality of threaded fasteners. Each of the plurality of threaded fasteners is initially tightened. After initial tightening, an initial couple imbalance of the spindle is determined. After the initial couple imbalance is determined, a first selected threaded fastener of the plurality of threaded fasteners is selected and rotated by a first amount of rotation that is significantly different from a second amount of rotation of a second selected threaded fastener of the plurality of threaded fasteners. The selection and rotation of the first selected threaded fastener of the plurality of fasteners is determined based on the initial couple imbalance of the spindle.

DESCRIPTION OF THE PREFERRED EMBODIMENTS

Figure 1:
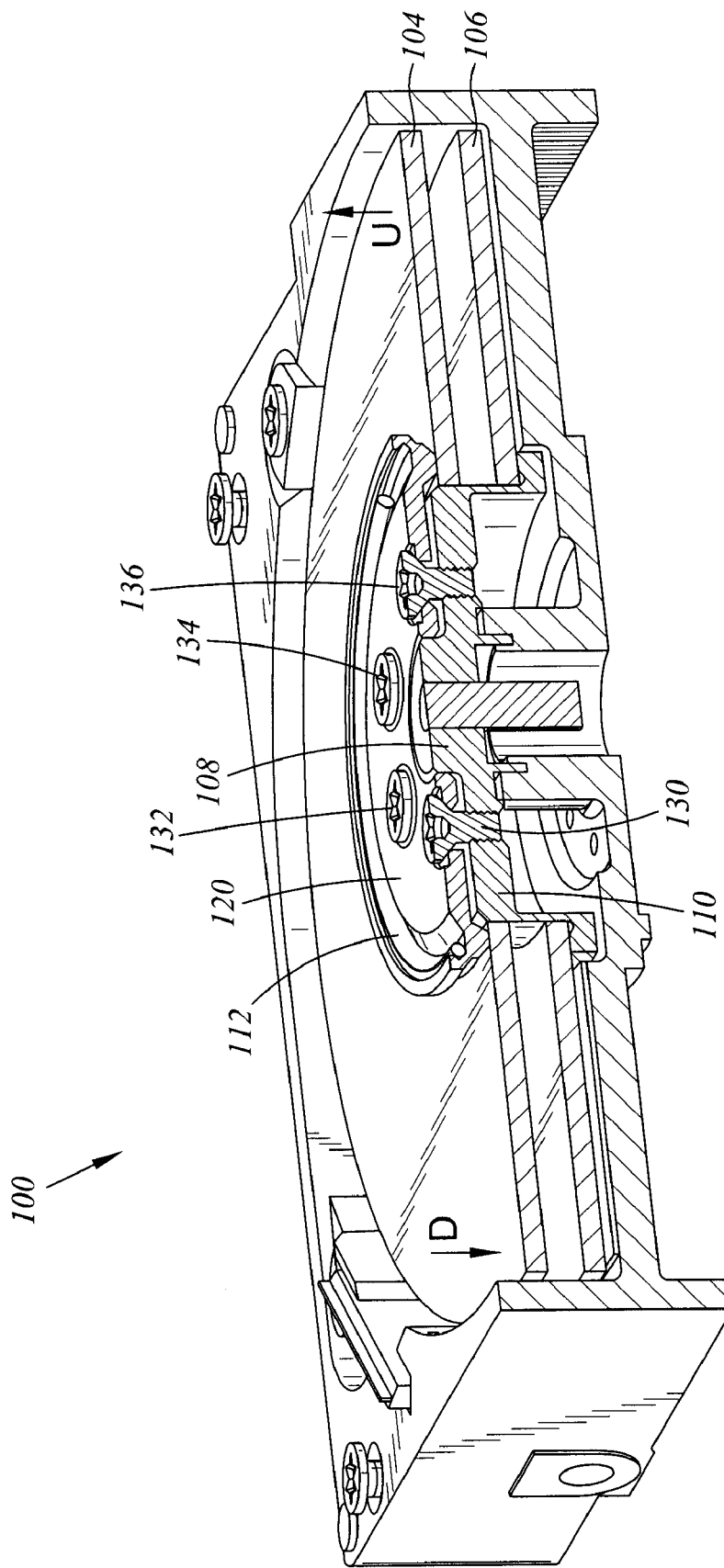
FIG. 1 is a cross-sectional perspective view of a disk drive capable of assembly by a method according to an embodiment of the present invention.

FIG. 1 is a cross-sectional perspective view of a disk drive 100 capable of assembly by a method according to an embodiment of the present invention. An optional conventional balancing ring 112 is positioned at the top of disk clamp 120 of the spindle 108. The conventional balancing ring 112 includes a gap along its circumference so that it is an open ring rather than a closed ring. The gap constitutes a region of reduced mass that can be angularly positioned for balancing. Mechanical interference between a free position of the conventional balancing ring 112 and a corresponding groove in the disk clamp 120 creates a radial force that, through friction, resists incidental re-positioning of the conventional balancing ring 120 relative to the disk clamp 120 (while allowing deliberate re-positioning during balancing).

The disk clamp 120 clamps the two disks 104 and 106 and associated spacer ring(s) to the hub 110 of spindle 108 so that those disks and spacer rings rotate with the hub 110. "Spindle" may refer to the rotating hub, and everything affixed to rotate with the hub such as the disk clamp and what it clamps (disks and spacer rings). In the embodiment of FIG. 1, the disk clamp 120 of the spindle 108 is fastened to the hub 110 by screw-type threaded fasteners (e.g. screw fasteners 130, 132, 134 and 136) so as to rotate with the hub 110. It is contemplated that the plurality of threaded fasteners may include various numbers of fasteners—preferably three or more. It is also contemplated that the disk drive 100 may include greater or fewer than two disks (e.g. one disk, three disks, etc).

Figure 2:
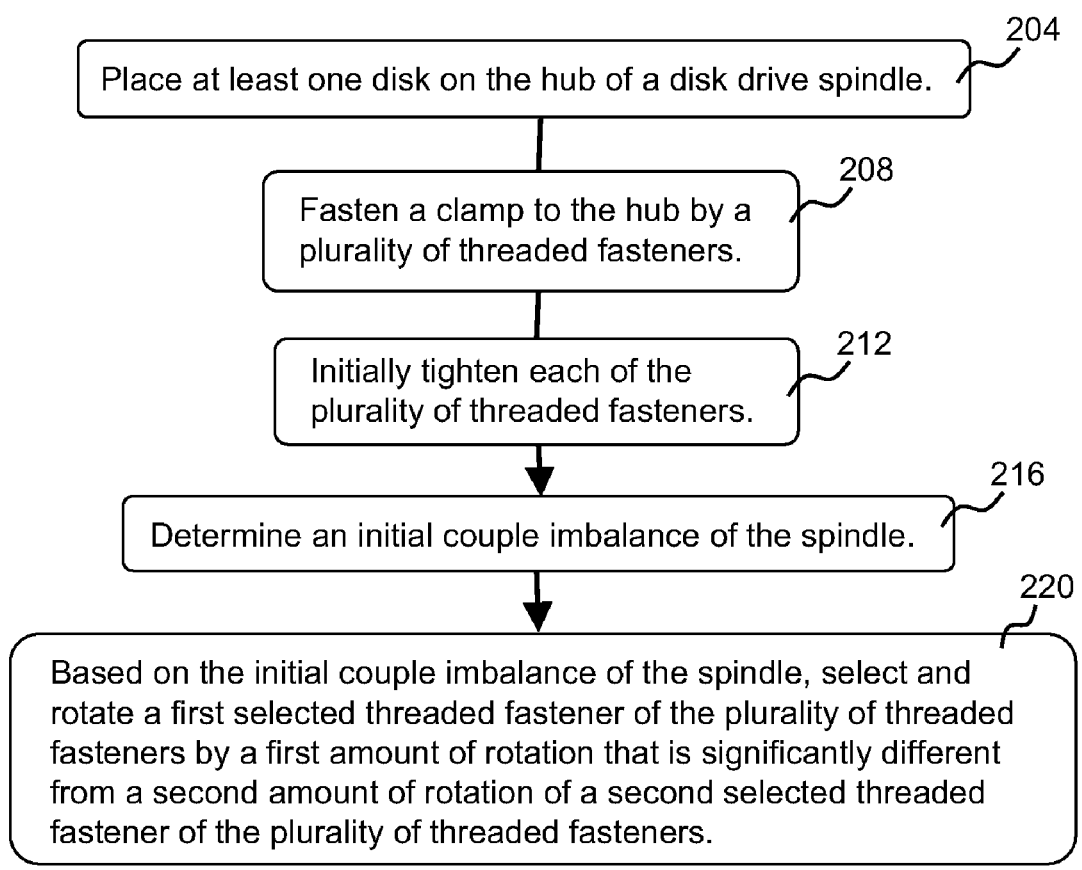
FIG. 2 depicts a flow chart of the steps of a method to assemble a disk drive according to an embodiment of the present invention.

FIG. 2 depicts a flow chart 200 of the steps of a method to assemble a disk drive, according to an exemplary embodiment of the present invention. In step 204, at least one disk (e.g. disk 104 and/or disk 106 of FIG. 1) is placed on the hub (e.g. hub 110 of FIG. 1). In step 208, a clamp is fastened to the hub by a plurality of threaded fasteners. For example, the plurality of threaded fasteners may be screws. In step 212, each of the plurality of threaded fasteners is initially tightened. For example, each of the plurality of threaded fasteners may be initially tightened to the same specified torque.

Still referring to the embodiment of FIG. 2, in step 216, after initial tightening, an initial couple imbalance of the spindle is determined. For example, the initial couple imbalance may be determined by the same automatic balancing machine that is used to determine radial imbalance and/or used to install a balancing ring on the spindle hub. The initial couple imbalance may also be determined by estimation based on a measurement of an out-of-plane disk deflection near the disk outer diameter. For example, out-of-plane disk deflection may be measured using a capacitance probe or by reflecting a laser from the surface of the disk while the disk is spinning (e.g. using a conventional laser interferometer, by laser Doppler anemometry, or by laser Doppler vibrometry, etc). Alternatively, the initial couple imbalance may be estimated by measuring the vibration emitted by the disk drive, if the geometry and mass of the rotating components are known.

Still referring to the embodiment of FIG. 2, in step 220, after determining the initial couple imbalance, a first selected threaded fastener of the plurality of threaded fasteners is selected and rotated by a first amount of rotation that is significantly different from a second amount of rotation of a second selected threaded fastener of the plurality of threaded fasteners. The amounts of rotation are based on the determined initial couple imbalance of the spindle. For example, the second amount of rotation may be zero, while the first amount of rotation may be an amount that is sufficient to adjust the tilt of the disks by a measurable tilt angle, that preferably compensates for the initial couple imbalance.

Also for example, the first amount of rotation may be determined to achieve a specified vertical displacement of the first selected threaded fastener, and the second amount of rotation may be determined to achieve a significantly different specified vertical displacement of the second selected threaded fastener. Also for example, the first amount of rotation may be determined to achieve a specified torque of the first selected threaded fastener, and the second amount of rotation may be determined to achieve a significantly different specified torque of the second selected threaded fastener. The amounts of rotation may be measured, for example by use of an encoder.

Figure 3A:
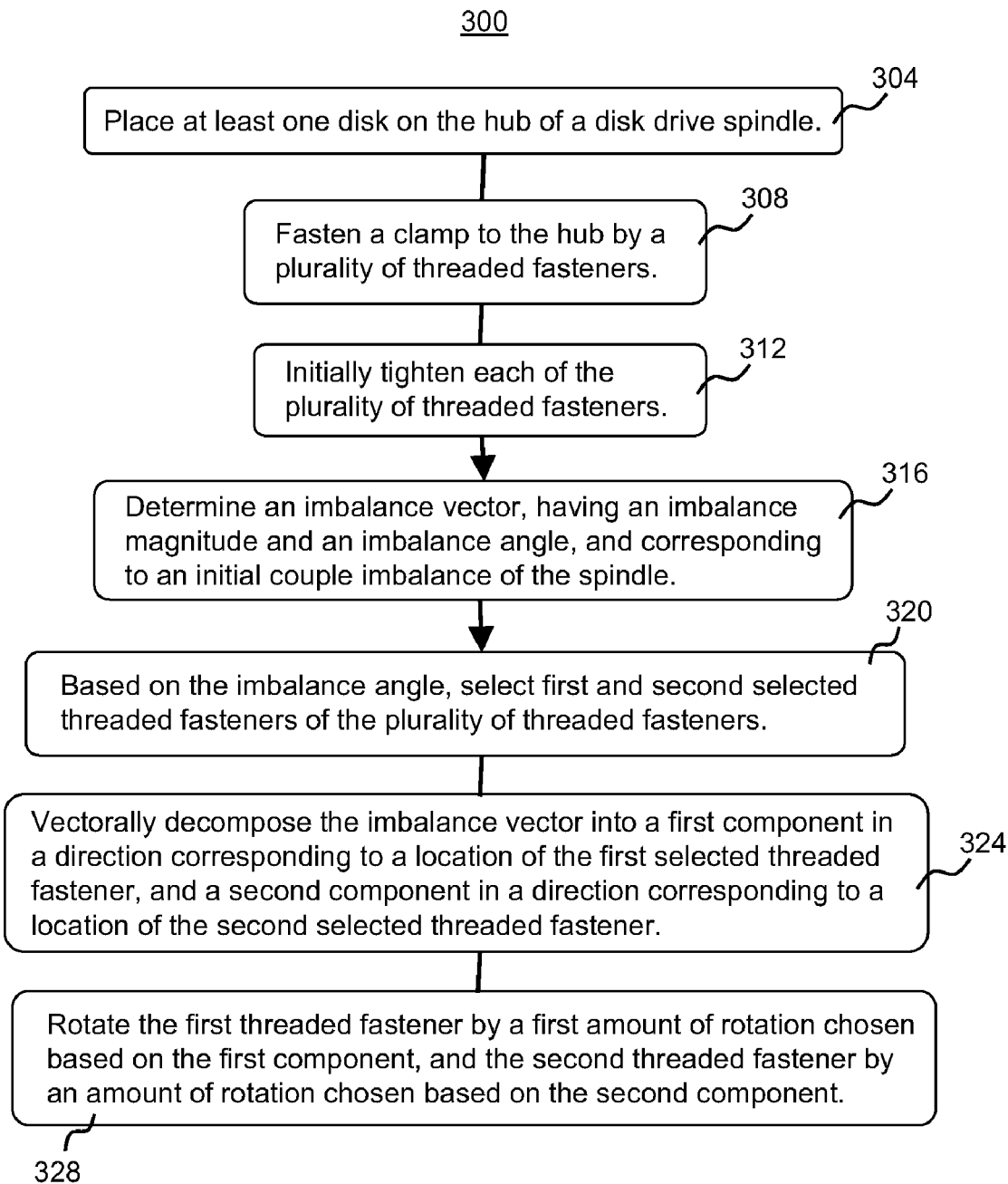
FIG. 3A depicts a flow chart of the steps of a method to assemble a disk drive according to another embodiment of the present invention.

FIG. 3A depicts a flow chart 300 of the steps of a method to assemble a disk drive, according to another exemplary embodiment of the present invention. In step 304, at least one disk (e.g. disk 104 and/or disk 106 of FIG. 1) is placed on the hub (e.g. hub 110 of FIG. 1). In step 308, a clamp is fastened to the hub by a plurality of threaded fasteners. In step 312, each of the plurality of threaded fasteners is initially tightened.

Figure 3B:
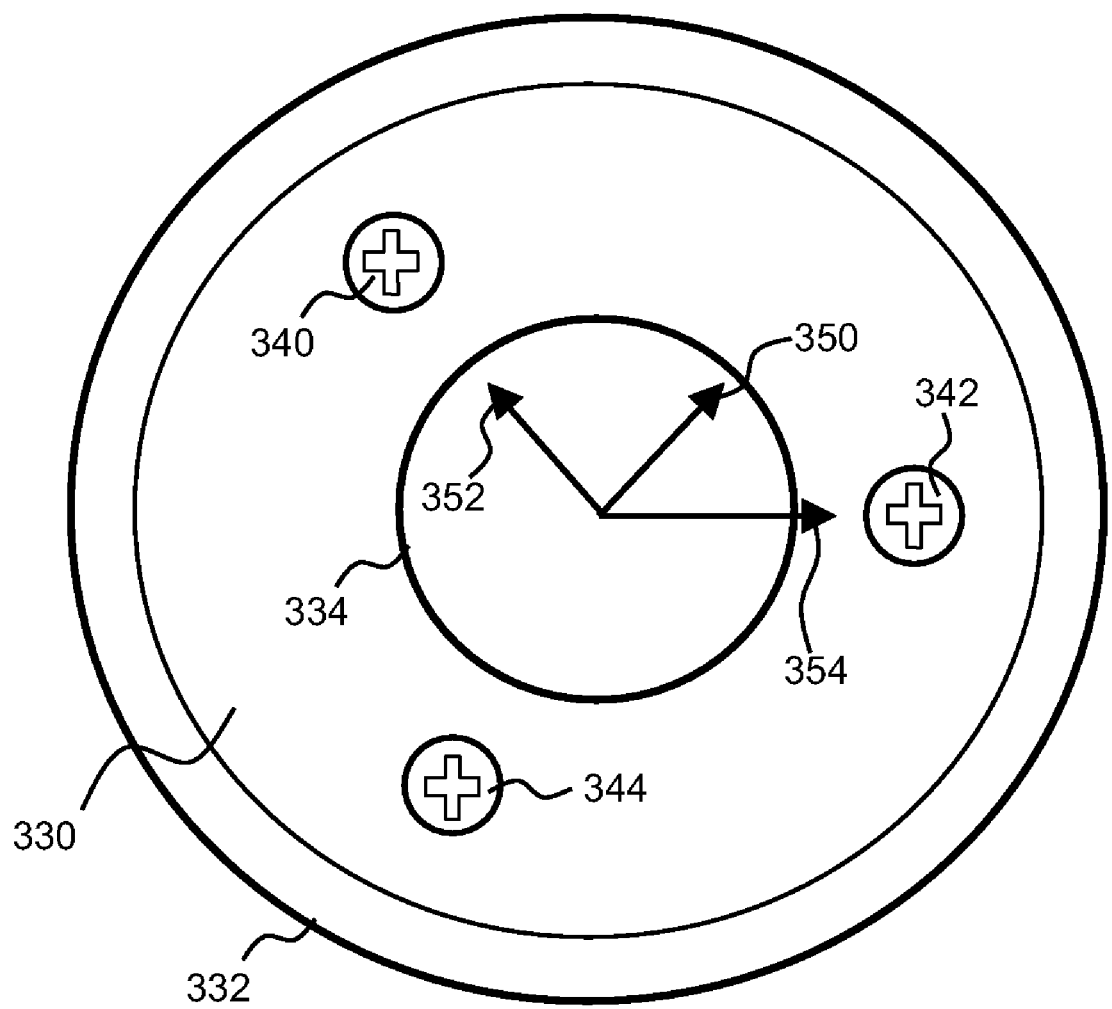
FIG. 3B depicts an example of vector decomposition along coordinate directions defined by the location of fasteners on a disk clamp.

FIG. 3B depicts an example of vector decomposition along coordinate directions defined by the location of threaded fasteners 340, 342, and 344 on an annular disk clamp 330 that has an outer circumference 332 and an inner circumference 334. Now referring to FIGS. 3A and 3B, in step 316, after initially tightening, an imbalance vector (e.g. imbalance vector 350), having an imbalance magnitude and an imbalance angle and corresponding to an initial couple imbalance of the spindle, is determined. In step 320, after the imbalance vector is determined, first and second selected threaded fasteners of the plurality of threaded fasteners (e.g. selected fasteners 340 and 342 of the plurality of threaded fasteners 340, 342, 344) are selected based on the imbalance angle. In step 324, the imbalance vector (e.g. imbalance vector 350) is vectorally decomposed into a first component (e.g. first vector component 352) in a direction corresponding to a location of the first selected threaded fastener (e.g. the location of first selected threaded fastener 340), and a second component (e.g. second vector component 354) in a direction corresponding to a location of the second selected threaded fastener (e.g. the location of second selected threaded fastener 342). Although a disk clamp having three fasteners is shown in FIG. 3B, the method of the embodiment of FIG. 3A may be applied to any disk drive having a clamp fastened by more than two fasteners.

In step 328 of the embodiment of FIG. 3A, the first threaded fastener is rotated by a first amount of rotation chosen based on the first component, and the second threaded fastener is rotated by a second amount of rotation chosen based on the second component. In certain embodiments, only certain discrete amounts of rotation are practical for the apparatus that turns the threaded fasteners and/or the device that measures the rotation (e.g. an optical encoder having an internal disk with a number of discrete lines). In such cases, the practical discrete amount of rotation nearest to the desired amount of rotation will be used.

Figure 4:
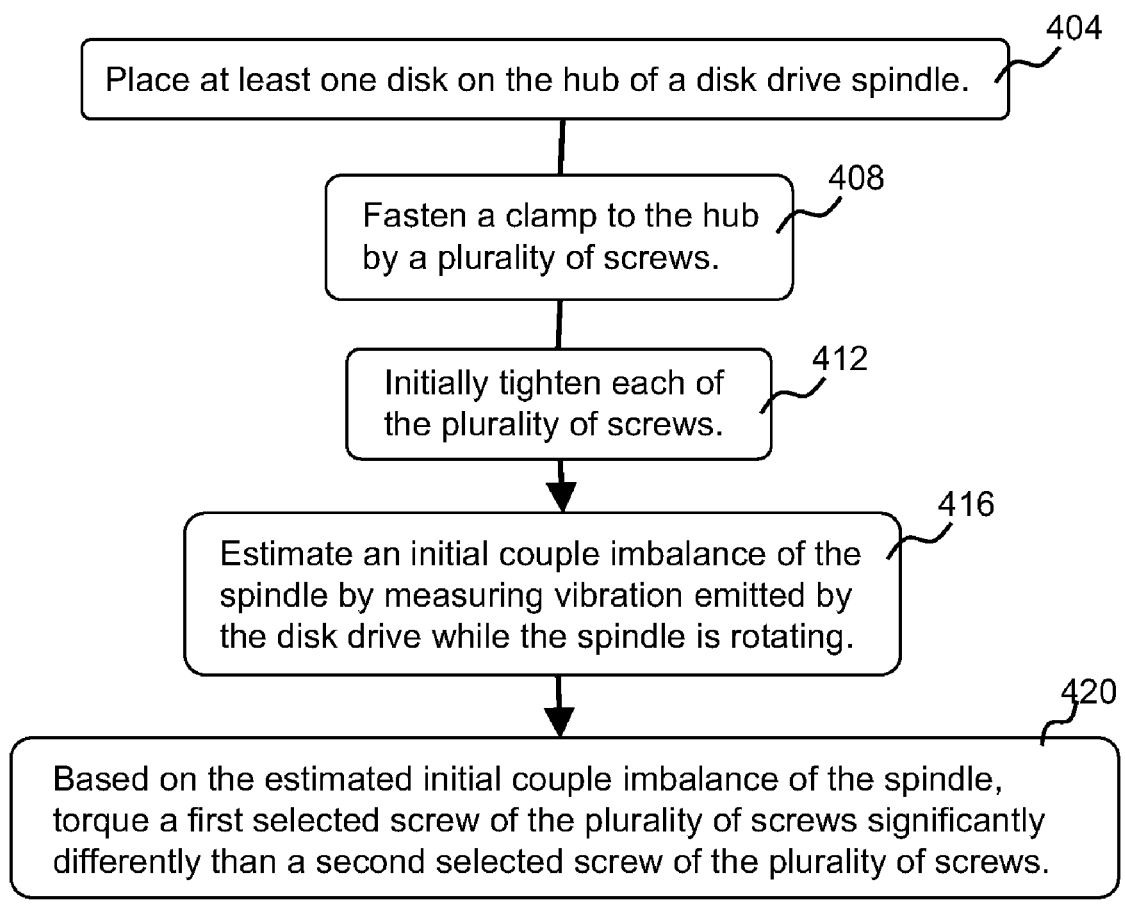
FIG. 4 depicts a flow chart of the steps of a method to assemble a disk drive according to another embodiment of the present invention.

FIG. 4 depicts a flow chart 400 of the steps of a method to assemble a disk drive, according to another exemplary embodiment of the present invention. In step 404, at least one disk (e.g. disk 104 and/or disk 106 of FIG. 1) is placed on the hub (e.g. hub 110 of FIG. 1). In step 408, a clamp is fastened to the hub by a plurality of screws. In step 412, each of the plurality of screws is initially tightened.

Still referring to the embodiment of FIG. 4, in step 416, after initially tightening, an initial couple imbalance of the spindle is estimated by measuring the vibration emitted by the disk drive while the spindle is rotating. Preferably, the vibration component in the Z direction (i.e. a direction parallel to the spindle axis of rotation) is measured.

Still referring to the embodiment of FIG. 4, in step 420, based on the estimated initial couple imbalance of the spindle, a first selected screw of the plurality of threaded fasteners is selected and torqued significantly differently from a second selected screw of the plurality of screws. For example, the torque difference is significant where it adjusts the tilt of the disks by a measurable tilt angle (e.g. such that the initial couple imbalance is thereby reduced). The respective screw torques may be realized, for example, by use of a torque-limited tool for driving the screws. In certain embodiments, only certain discrete screw torques are possible for a given screw-driving tool, in which case the practical discrete screw torque nearest to the desired screw torque will be used.

Figure 5:
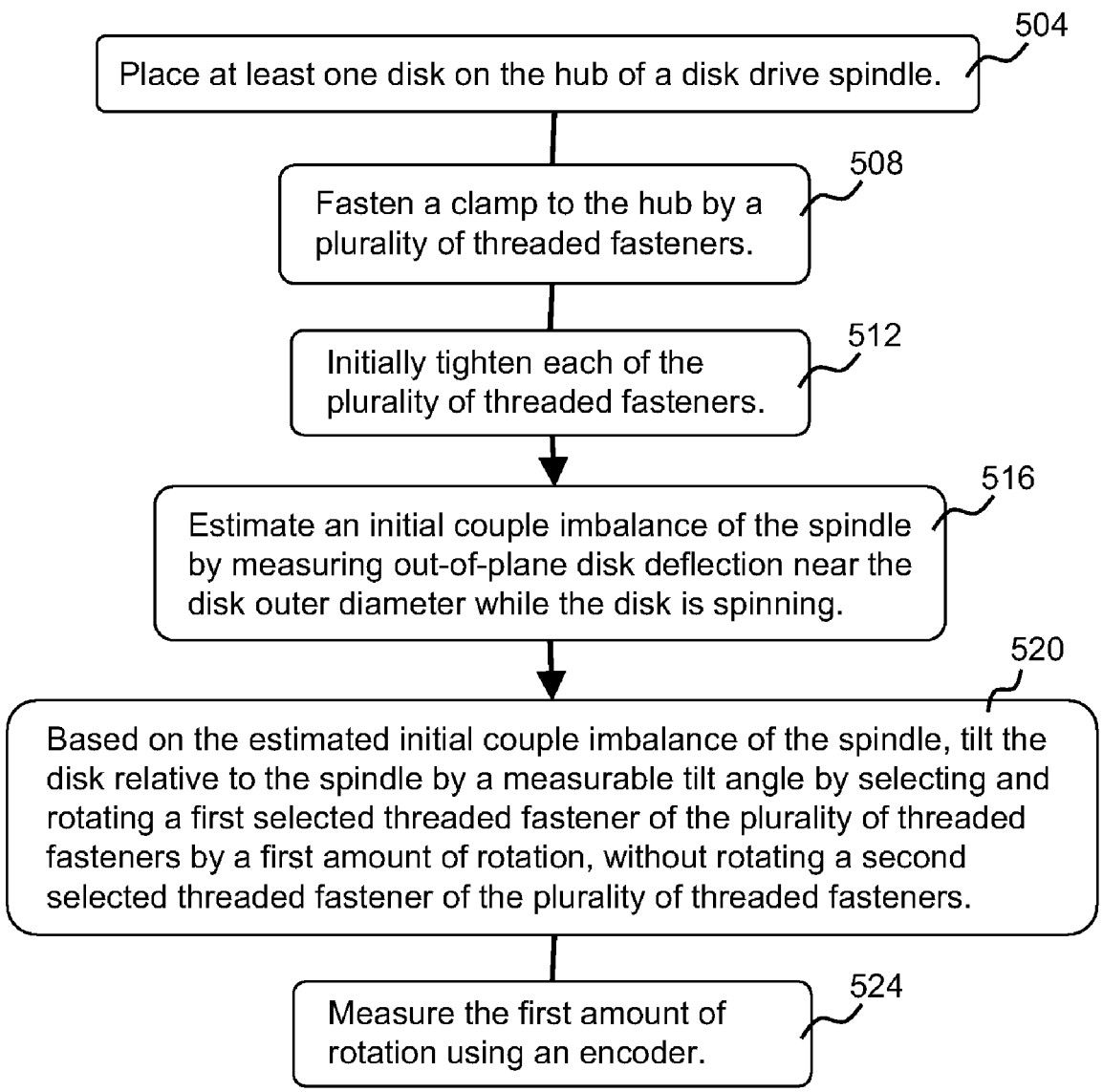
FIG. 5 depicts a flow chart of the steps of a method to assemble a disk drive according to another embodiment of the present invention.

FIG. 5 depicts a flow chart 500 of the steps of a method to assemble a disk drive, according to another exemplary embodiment of the present invention. In step 504, at least one disk (e.g. disk 104 and/or disk 106 of FIG. 1) is placed on the hub (e.g. hub 110 of FIG. 1). In step 508, a clamp is fastened to the hub by a plurality of threaded fasteners. In step 512, each of the plurality of threaded fasteners is initially tightened.

Still referring to the embodiment of FIG. 5, in step 516, after initially tightening, an initial couple imbalance of the spindle is estimated based on a measurement of an out-of-plane disk deflection near the disk outer diameter while the disk is spinning. For example, out-of-plane disk deflection may be measured using a capacitance probe or by reflecting a laser from the surface of the disk while the disk is spinning (e.g. using a conventional laser interferometer, by laser Doppler anemometry or laser Doppler vibrometry, etc).

Still referring to the embodiment of FIG. 5, in step 520 the disk is tilted relative to the spindle by a measurable tilt angle by selecting and rotating a first selected threaded fastener of the plurality of threaded fasteners by a first amount of rotation, without rotating a second selected threaded fastener of the plurality of threaded fasteners. For example, tightening threaded fastener 130 in FIG. 1 may tilt the disk 104 in the sense shown by arrows D and U. In the embodiment of FIG. 5, the first amount of rotation is measured using an encoder in step 524.

In the foregoing specification, the invention is described with reference to specific exemplary embodiments thereof, but those skilled in the art will recognize that the invention is not limited thereto. It is contemplated that various features and aspects of the above-described invention may be used individually or jointly and possibly in an environment or application beyond those described herein. The specification and drawings are, accordingly, to be regarded as illustrative and exemplary rather than restrictive. The terms "comprising," "including," and "having," as used herein are intended to be read as open-ended terms.

We claim:

1. A method to assemble a disk drive, the disk drive having a spindle that includes a hub, the method comprising:
    placing at least one disk on the hub;
    fastening a clamp to the hub by a plurality of threaded fasteners;
    initially tightening each of the plurality of threaded fasteners;
    after initially tightening, determining an initial couple imbalance of the spindle; and
    after determining the initial couple imbalance, selecting and rotating a first selected threaded fastener of the plurality of threaded fasteners by a first amount of rotation that is significantly different from a second amount of rotation of a second selected threaded fastener of the plurality of threaded fasteners;
    wherein the selection and rotation of the first selected threaded fastener of the plurality of fasteners is determined based on the initial couple imbalance of the spindle.

2. The method of claim 1 wherein the second amount of rotation is zero.

3. The method of claim 1 wherein the first amount of rotation is determined to achieve a specified vertical displacement of the first selected threaded fastener, and the second amount of rotation is determined to achieve a specified vertical displacement of the second selected threaded fastener.

4. The method of claim 3 wherein the specified vertical displacement of the first selected threaded fastener is significantly different from the specified vertical displacement of the second selected threaded fastener.

5. The method of claim 1 wherein the first amount of rotation is determined to achieve a specified torque of the first selected threaded fastener, and the second amount of rotation is determined to achieve a specified torque of the second selected threaded fastener.

6. The method of claim 5 wherein the specified torque of the first selected threaded fastener is significantly different from the specified torque of the second selected threaded fastener.

7. The method of claim 1, further comprising measuring the first amount of rotation using an encoder.

8. The method of claim 1, further comprising adding a balancing mass to the clamp.

9. The method of claim 8 wherein the initial couple imbalance is determined by an automated balancing machine.

10. The method of claim 1, further comprising tilting the disk relative to the spindle by a measurable tilt angle by rotating the first selected threaded fastener of the plurality of threaded fasteners by the first amount of rotation that is significantly different from the second amount of rotation of the second selected threaded fastener of the plurality of threaded fasteners.

11. The method of claim 1 wherein the plurality of threaded fasteners is a plurality of screws.

12. The method of claim 1 wherein the initial couple imbalance is determined by estimation based on a measurement of an out-of-plane disk deflection near a disk outer diameter, while the disk is spinning.

13. The method of claim 12 wherein the out-of-plane disk deflection is measured using a capacitance probe.

14. The method of claim 13 wherein the out-of-plane disk deflection is measured using a laser reflection from a surface of the disk.

15. The method of claim 1 wherein the initial couple imbalance is estimated by measuring a vibration emitted by the disk drive.

16. The method of claim 1 wherein determining the initial couple imbalance of the spindle comprises determining an imbalance vector having an imbalance magnitude and an imbalance angle.

17. The method of claim 16 wherein the first selected threaded fastener and the second selected threaded fastener are selected based on the imbalance angle.

18. The method of claim 17, further comprising vectorally decomposing the imbalance vector into two components, the two components comprising a first component in a direction corresponding to a location of the first selected threaded fastener, and a second component in a direction corresponding to a location of the second selected threaded fastener.

19. The method of claim 18 wherein the first amount of rotation is chosen based on the first component, and the second amount of rotation is chosen based on the second component.

* * * * *